(12) United States Patent
Xu et al.

(10) Patent No.: US 9,071,790 B2
(45) Date of Patent: Jun. 30, 2015

(54) REMOTE CONTROL METHOD, REMOTE CONTROLLER, REMOTE CONTROL RESPONSE METHOD AND SET-TOP BOX

(71) Applicant: Huawei Technologies Co., Ltd., Shenzhen, Guangdong (CN)

(72) Inventors: Xuesong Xu, Shenzhen (CN); Yasong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 13/659,575

(22) Filed: Oct. 24, 2012

(65) Prior Publication Data

US 2013/0128127 A1    May 23, 2013

(30) Foreign Application Priority Data

Nov. 1, 2011   (CN) .......................... 2011 1 0340072
Dec. 23, 2011  (CN) .......................... 2011 1 0439452

(51) Int. Cl.
| | |
|---|---|
| H04N 5/44 | (2011.01) |
| H04N 21/422 | (2011.01) |
| H04N 21/45 | (2011.01) |
| G06F 3/02 | (2006.01) |

(52) U.S. Cl.
CPC ....... *H04N 5/4403* (2013.01); *H04N 21/42222* (2013.01); *H04N 21/4532* (2013.01); *H04N 2005/4432* (2013.01); *G06F 3/0227* (2013.01)

(58) Field of Classification Search
CPC ............. G09G 5/08; G09G 5/00; G09G 5/44; G09G 5/445
See application file for complete search history.

(56) References Cited

U.S. PATENT DOCUMENTS

| | | | |
|---|---|---|---|
| 2004/0222971 A1 | 11/2004 | Mo | |
| 2006/0250358 A1* | 11/2006 | Wroblewski | .................. 345/157 |
| 2008/0030470 A1* | 2/2008 | Rensberger et al. | .......... 345/163 |
| 2010/0118210 A1 | 5/2010 | Carvajal et al. | |

FOREIGN PATENT DOCUMENTS

| | | |
|---|---|---|
| CN | 101185051 A | 5/2008 |
| FR | 2872598 A1 | 1/2006 |

OTHER PUBLICATIONS

Office Action dated Jul. 31, 2013 in connection with Chinese Patent Application No. 2011104394526.
European Search Report dated Jun. 13, 2013 in connection with European Patent Application No. EP 12 18 9468.

* cited by examiner

*Primary Examiner* — Michael Faragalla

(57) ABSTRACT

Embodiments of the present invention disclose a remote control method, a remote controller, a remote control response method, and a set-top box. The remote control method includes: sensing a user selection operation event, and judging a type of the user selection operation event; when the type of the user selection operation event is corresponding to an operation control mode type, sending a user selection operation event message; when the type of the user selection operation event is not corresponding to the operation control mode type, switching an operation control mode. The remote control method complies with a use habit of a user in terms of operation control mode switching, so that the user may trigger operation control mode switching through natural association without special learning, thereby improving a user experience effect.

19 Claims, 9 Drawing Sheets

REMOTE CONTROL METHOD, REMOTE CONTROLLER, REMOTE CONTROL RESPONSE METHOD AND SET-TOP BOX

CROSS-REFERENCE TO RELATED APPLICATIONS

This application claims priority to Chinese Patent Application No. 201110439452.6, filed on Dec. 23, 2011, and Chinese Patent Application No 201110340072.7, filed on Nov. 1, 2011, Both of which is hereby incorporated by reference in its entirety.

FIELD OF THE INVENTION

The present invention relates to the field of televisions, and in particular, to a remote control method, a remote controller, a remote control response method, and a set-top box.

BACKGROUND OF THE INVENTION

With the development of technologies and increasingly entertainment demands of users, a television and a set-top box that provides a service for the television have gradually become centers of family entertainment. In this case, the set-top box/the television not just provides simple live broadcast and on-demand content, but more likely acts as a PC to provide comprehensive and abundant service functions including videos, games, news, Internet, communication, and so on. More service functions require a more refined operation manner, but a conventional key-type remote controller cannot satisfy the foregoing operation requirements.

SUMMARY OF THE INVENTION

In view of this, it is indeed necessary to provide a remote control method that is convenient to be operated and complies with a use habit of a user.

A remote controller is also provided.
A remote control response method is also provided.
A set-top box is also provided.

An embodiment of the present invention, provides a remote control method, including: sensing a user selection operation event, and judging a type of the user selection operation event; when the type of the user selection operation event is corresponding to an operation control mode type, sending a user selection operation event message; when the type of the user selection operation event is not corresponding to the operation control mode type, switching an operation control mode, and sending a user selection operation event message; and sensing a user determination operation event, judging the operation control mode type, and sending a user determination operation event message that is corresponding to the operation control mode type.

Another embodiment of: the present invention provides a remote controller, including: a key event sensing unit, configured to sense a user selection operation event that is generated through key-press of a user; a displacement event sensing unit, configured to sense a user selection operation event, that is generated through mouse displacement; a determination event sensing unit, configured to sense a user determination operation event; a judging unit, configured to judge whether a type of the user selection operation event from the key event sensing unit or the displacement event sensing unit is corresponding to an operation control mode type; a switching unit, configured to, when the type of the user selection operation event is not corresponding to the operation control mode type, switch an operation control mode; and a sending unit, configured to send a user selection operation event message, and send a user determination operation event message that is corresponding to the operation control mode type.

Another embodiment of the present invention provides a remote control response method, including: receiving a user selection operation event message, and judging a type of a user operation event according to the user selection operation event message; when the type of the user selection operation event is corresponding to an operation control mode type, controlling displaying of a display interface of a controlled display device according to the user selection operation event message and a corresponding operation control mode; and when the type of the user selection operation event is not corresponding to the operation control mode type, switching the corresponding operation control mode, and controlling the displaying of the display interface of the controlled display device according to the user selection operation event message and the switched operation control mode; and receiving a user determination operation event message, judging the operation control mode type, and performing a determination operation on the controlled display device according to the operation control mode.

Another embodiment of the present invention provides a set-top box, including: a message receiving module, configured to receive a user selection operation event message and a user determination operation event message; a judging module, configured to judge, according to the user selection operation event message, whether a type of a user operation event is corresponding to an operation control mode type; a switching module, configured to, when the type of the user selection operation event is not corresponding to the operation control mode type, switch an operation control mode; and a response module, configured to control, according to the user selection operation event message and a corresponding operation control mode, displaying of a display interface of a controlled display device, and perform a determination operation on the controlled display device according to the user determination operation event message and the operation control mode.

With the remote controller in the embodiment of the present invention, because a left mouse button of the remote controller is combined with a remote control confirm key, a remote control operation interface is simple, and a user does not need to move a thumb, so that the user uses the remote controller more comfortably and simply. In addition, the remote controller complies with a use habit of the user in terms of operation control mode switching, so that the user may trigger operation control mode switching through natural association without special learning, thereby improving a user experience effect. At the same time, when the user operates in a key mode, a mouse pointer is hidden, so that a disturbance brought by two visual concerns appearing on a display interface of a multimedia television is avoided, and the user experience effect is further improved.

DETAILED DESCRIPTION OF THE EMBODIMENTS

The technical solutions in the embodiments of the present invention are clearly and fully described in the following with reference to the accompanying drawings in the embodiments of the present invention. Obviously, the embodiments to be described are only a part rather than all of the embodiments of the present invention. Based on the embodiments of the present invention, all other embodiments obtained by persons of ordinary skill in the art without creative efforts shall fall within the protection scope of the present invention.

Figure 1:
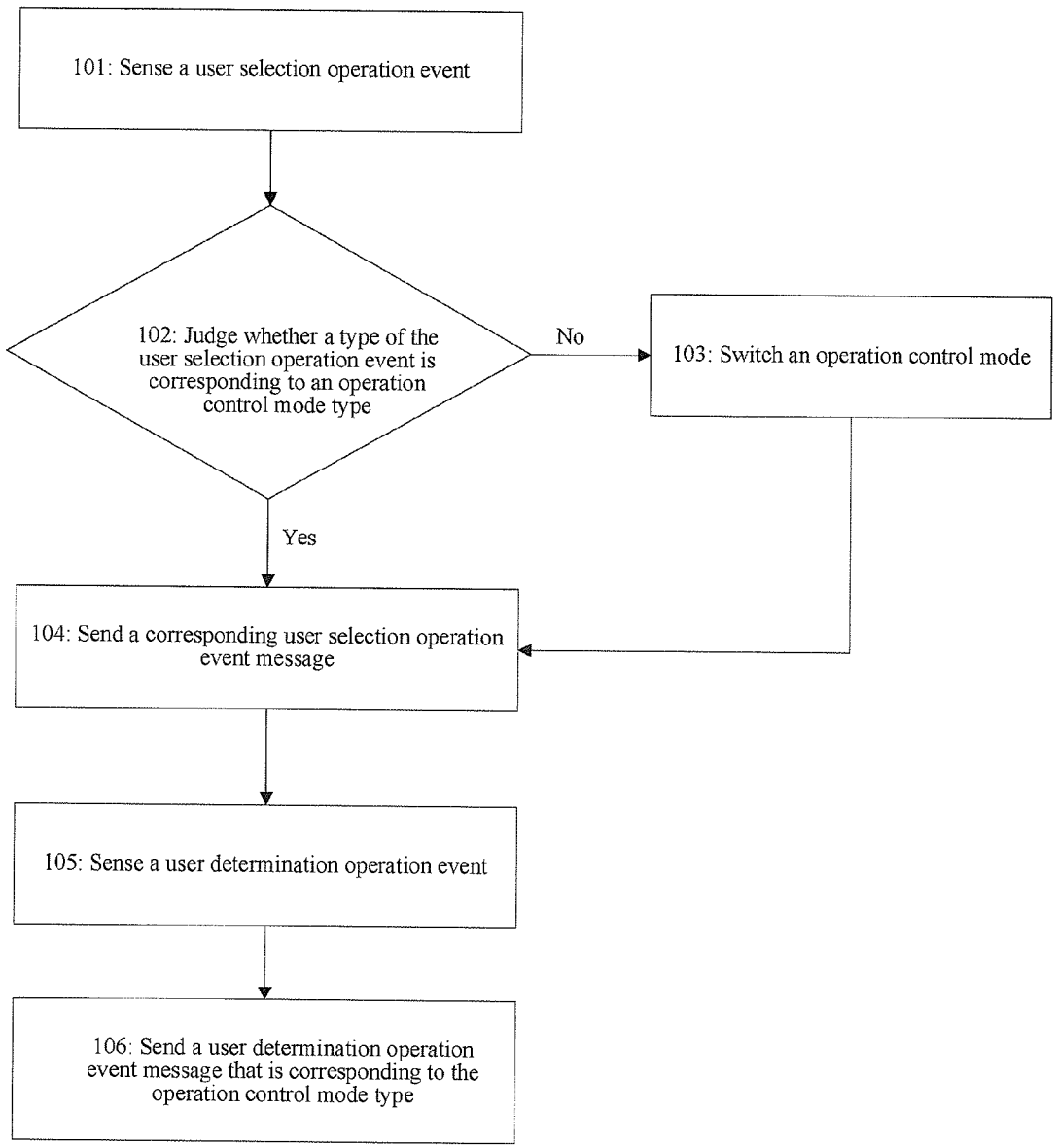
FIG. 1 is a flow chart of a remote control method according to an embodiment of the present invention.

FIG. 1 is a flow chart of a remote control method according to an embodiment of the present invention, where the method includes:

101: Sense a user selection operation event.

Specifically, a sensing apparatus is disposed inside a remote controller, and can sense a selection operation event of a user on the remote controller. In this embodiment, the user selection operation event includes a mouse displacement event and a direction key event. The mouse displacement event is that the user changes a position of the remote controller in three-dimensional space, and includes continuously and rapidly moving left and right or moving up and down for multiple times; or continuously and rapidly sliding a touch interface left and right for three times on a remote controller with the touch interface. The direction key event is that the user presses multiple direction keys that are disposed on the remote controller.

102: Judge whether a type of the user selection operation event is corresponding to an operation control mode type.

Specifically, in this embodiment, an operation control mode of the remote controller is classified into two types. One is a mouse mode, and in this mode, the remote controller may be used as a mouse to operate and control a set-top box or a multimedia television by spatially moving or sliding a touch screen. The other one is a key mode, and in this mode, the remote controller functions as a conventional remote controller, which may control a set-top box or a multimedia television by pressing a function key that is disposed on the remote controller. The remote controller, after sensing the user selection operation event type, further analyzes an operation control mode of the remote controller, and further judges whether the user selection operation event is corresponding to the operation control mode, which includes: One is that if the user selection operation event is a mouse displacement event, and the operation control mode is a mouse mode, the user selection operation event is corresponding to the operation control mode; another one is that if the user selection operation event is a direction key event and the operation control mode is a key mode, the user selection operation event is also corresponding to the operation control mode; and furthermore, another one is that if the user selection operation event is a mouse displacement event, but the operation control mode is a key mode, or the user selection operation event is a direction key event, but the operation control mode is a mouse mode, the user selection operation event is not corresponding to the operation control mode.

103: When the user selection operation event is not corresponding to the operation control mode, switch the operation control mode.

Figure 6:
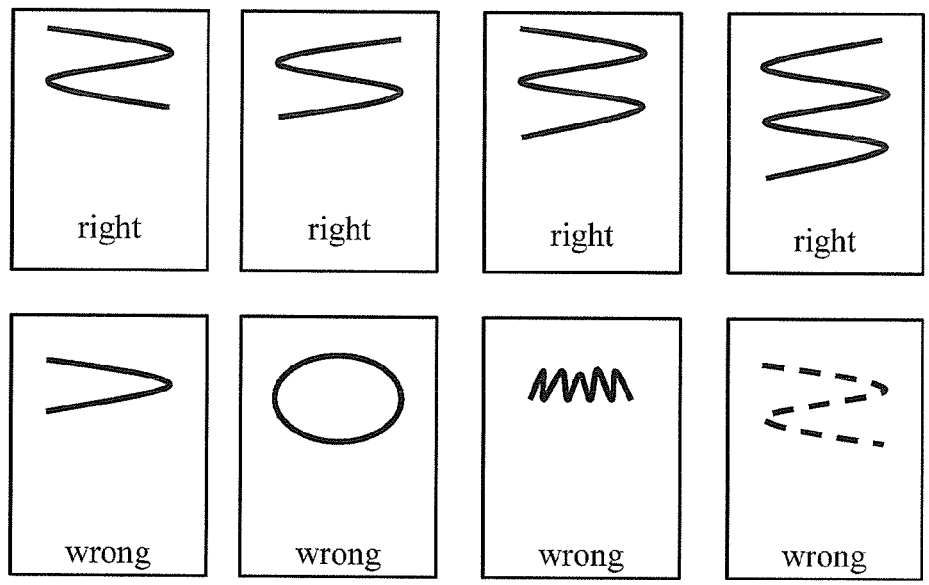
FIG. 6 is a schematic diagram of a preset operation event of a remote control method according to an embodiment of the present invention.

Specifically, when the user selection operation event is a mouse displacement event and the operation control mode is a key mode, or the user selection operation event is a direction key event and the operation control mode is a mouse mode, the operation control mode is switched automatically, that is, when the user selection operation event is a mouse displacement event and the operation control mode is a key mode, the operation control mode is automatically switched into a mouse mode, and when the user selection operation event is a direction key event and the operation control mode is a mouse mode, the operation control mode is switched into a key mode, so that it is convenient for the user to perform a subsequent mouse or remote control operation. Switching between the mouse mode and the operation control mode may be implemented through a software program. Particularly, when the remote controller switches from a key mode to a mouse mode, a mouse displacement event needs to comply with a specific operation action, that is, whether the mouse displacement event is a preset user selection operation event as shown in FIG. 6, for example, continuously and rapidly moving the remote controller left and right for more than three times. If the mouse displacement event does not comply with a specific operation action, the operation control mode is not switched from a key mode to a mouse mode. In this way, frequent switching of the operation control mode, caused by misoperation of the user, may be avoided. In other embodiments of the present invention, the specific operation action may be randomly set by the user or a device provider of a set-top box or a television.

104: Send a corresponding user selection operation event message.

Specifically, when the user selection operation event is a mouse displacement event, the remote controller sends a mouse displacement event message to a set-top box or a multimedia television, so that the set-top box or the multimedia television displays, according to a mouse displacement event output by the user, a mouse pointer on a display interface of the multimedia television, and hides a control focus at the same time. Therefore, the multimedia television only splays one attention focus of the user, thereby avoiding a visual error, and improving user experience. In addition, when the user selection operation event is a direction key event, the remote controller sends a direction key event message to the set-top box, so that the set-top box or the multimedia television displays a control focus and hides a pointer on the display interface of the multimedia television, and therefore, a corresponding response is made conveniently according to a subsequent remote control key operation of the user.

105: Sense a user determination operation event.

Specifically, in this embodiment of the present invention, on the remote controller, a conventional left mouse button is combined with a confirm key of a conventional remote controller. When the remote controller is in a mouse mode, the user presses a confirm key to generate a determination function of a left mouse button. When the remote controller is in a key mode, the user presses a confirm key to generate a key determination function.

106: Send a user determination operation event message that is corresponding to the operation control mode type.

Specifically, in this embodiment of the present invention, the operation control mode is classified into two types, namely, mouse mode and a key mode. Therefore, the operation control mode is either a key mode or a mouse mode. When the operation control mode is a key mode, a remote control confirm key event message is sent, so that the set-top box or the multimedia television selects a determined application according to the remote control confirm key event message, and therefore the application responds according to user selection. When the operation control mode is a mouse mode, a left mouse button event message is sent, so that the set-top box or the multimedia television selects a determined application according to the left mouse button event message, and therefore the application responds according to user selection.

Figure 2:
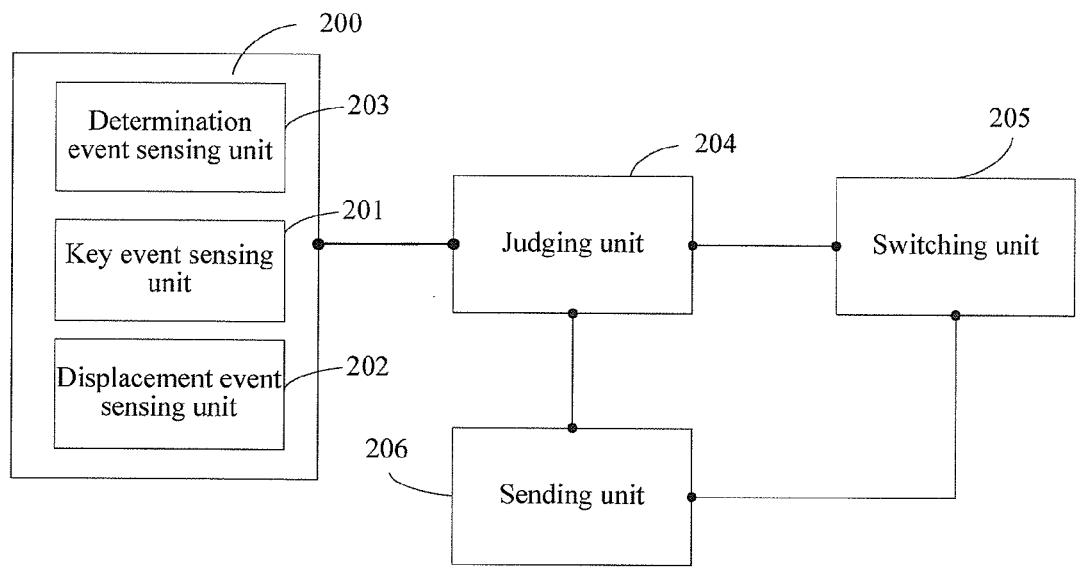
FIG. 2 is a diagram of function modules of a remote controller according to an embodiment of the present invention.

FIG. 2 is a structural block diagram of a remote controller according to an embodiment of the present invention.

A sensing unit 200 is included, and the sensing unit 200 specifically includes a key event sensing unit 201, a displacement event sensing unit 202, a determination event sensing unit 203, a judging unit 204, a switching unit 205, and a sending unit 206. The key event sensing unit 201 is configured to sense a direction key operation event of a user. Specifically, the key event sensing unit 201 may be a direction key that is disposed on a remote controller and a circuit module that is connected to the direction key, and may sense an operation of the user on the direction key.

The displacement event sensing unit 202 is configured to sense a mouse displacement event, specifically may be an apparatus such as a gyroscope or a grating, where the gyroscope or the grating is disposed inside the remote controller, and may sense and convert a change of a spatial position of the remote controller into X,Y coordinate displacement of a mouse.

The determination event sensing unit 203 is configured to sense a user determination operation event, and may be a confirm key that is disposed on the remote controller and a circuit module that is connected to the confirm key, which may sense an operation of the user on the confirm key.

The judging unit 204 is configured to judge an operation control mode type of the remote controller, and further configured to judge whether a type of a user selection operation event is corresponding to an operation control mode, so that the switching module 205 performs corresponding switching according to whether the operation control mode is corresponding to the type of the user selection operation event. Specifically, if the user selection operation event is a mouse displacement event and the operation control mode is a mouse mode, the user selection operation event, is corresponding to the operation control mode. Another one is that if the user selection operation event is a direction key event and the operation control mode is a key mode, the user selection operation event is also corresponding to the operation control mode. Furthermore, another one is that if the user selection, operation event is a mouse displacement event, but the operation control mode is a key mode, or the user selection operation event is a direction key event, but the operation control mode is a mouse mode, the user selection on operation event is not corresponding to the operation control mode.

The switching unit 205 is configured to, when the operation control mode is not corresponding to the user selection operation event, switch the operation control mode. Specifically, when the user selection operation event is a mouse displacement event and the operation control mode is a key mode, or the user selection operation event is a direction key event and the operation control mode is a mouse mode, the operation control mode is switched first, that is, when the user selection operation event is a mouse displacement event and the operation control mode is a key mode, the operation control mode is switched into a mouse mode, and when the user selection operation event is a direction key event and the operation control mode is a mouse mode, the operation control mode is switched into a key mode, so that it is convenient, for the user to perform a subsequent mouse or remote control operation. Particularly, when the remote controller switches from a key mode to a mouse mode, a mouse displacement event needs to comply with a specific operation action, for example, continuously and rapidly moving the remote controller left and right for more than three times. If the mouse displacement event does not comply with a specific operation action, the operation control mode is not switched from a key mode to a mouse mode. In this way, frequent switching of the operation control mode, caused by misoperation of the user, may be avoided.

The sending unit 206 is configured to send a corresponding user selection operation event message. Specifically, when the user selection operation event is a mouse displacement event, the remote controller sends a mouse displacement event message to a set-top box or a multimedia television, so that the set-top box or the multimedia television displays, according to a mouse displacement event output by the user, a mouse pointer on a display interface of the multimedia television, and hides a control focus at the same time. Therefore, the multimedia television only displays one attention focus of the user, thereby avoiding a visual error, and improving user experience. In addition, when the user selection operation event is a direction key event, the remote controller sends a direction key event message to the set-top box, so that the set-top box or the multimedia television displays a control focus and hides a pointer on the display interface of the multimedia television, and therefore, a corresponding response is made conveniently according to a subsequent remote control key operation of the user.

In addition, in another embodiment of the present invention, the sending unit 206 further sends a corresponding determination operation event message according to the operation control mode. Specifically, when the operation control mode is a mouse mode, a left mouse button event is sent, so that the set-top box or the multimedia television selects a determined application according to the left mouse button event, and therefore the application responds according to user selection.

With the remote controller in the foregoing embodiment of the present invention, because a left mouse button of the remote controller is combined with a remote control confirm key, a remote control operation interface is simple, and a user does not need to move a thumb, so that the user uses the remote controller more comfortably and simply. In addition, the remote controller complies with a use habit of the user in terms of operation control mode switching, so that the user may trigger operation control mode switching through natural association without special learning, thereby improving a user experience effect. At the same time, when the user operates in a key mode, a mouse pointer is hidden, so that a disturbance brought by two visual concerns appearing on a display interface of a multimedia television is avoided, and the user experience effect is further improved.

Figure 3:
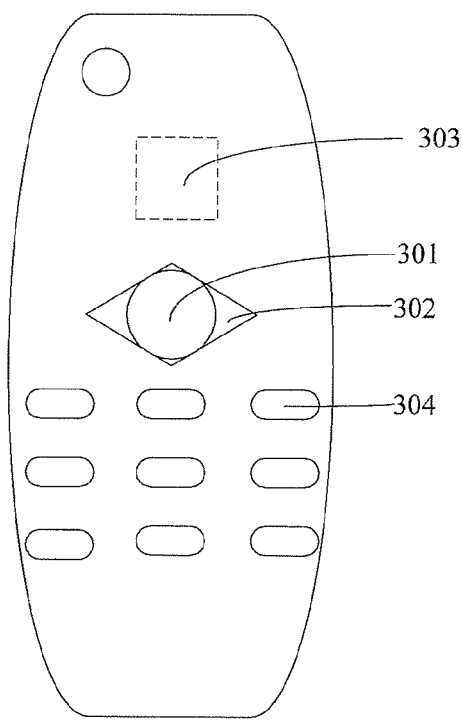
FIG. 3 is a schematic structural diagram of a remote controller according to another embodiment of the present invention.

FIG. 3 is a schematic structural of a remote controller according to another embodiment of the present invention.

A confirm key 301, several direction keys 302, a sensing module 303, and several function keys 304 are included. The confirm key 301 is configured to sense a use determination operation event. The confirm key 301 is connected to a circuit module, and may sense an operation of a user on the confirm key. The direction key 302 is configured to sense a direction key event of the user. Specifically, the direction key 302 is connected to a circuit module, and may sense an operation of the user on the direction key. The sensing module 303 is configured to sense a mouse displacement event, and convert a change of a remote controller in three-dimensional space into a change of coordinates X,Y of a mouse. The sensing module 303 may specifically be implemented through a gyroscope, a grating, a camera, a touch screen, a trackball and a light-sensitive trackball inside the remote controller. With the remote controller in this embodiment of the present invention, because a left mouse button is combined with a remote control confirm key, an operation interface of the remote controller is simpler, and the user can select a determined application without moving a thumb, thereby improving user experience.

Figure 4:
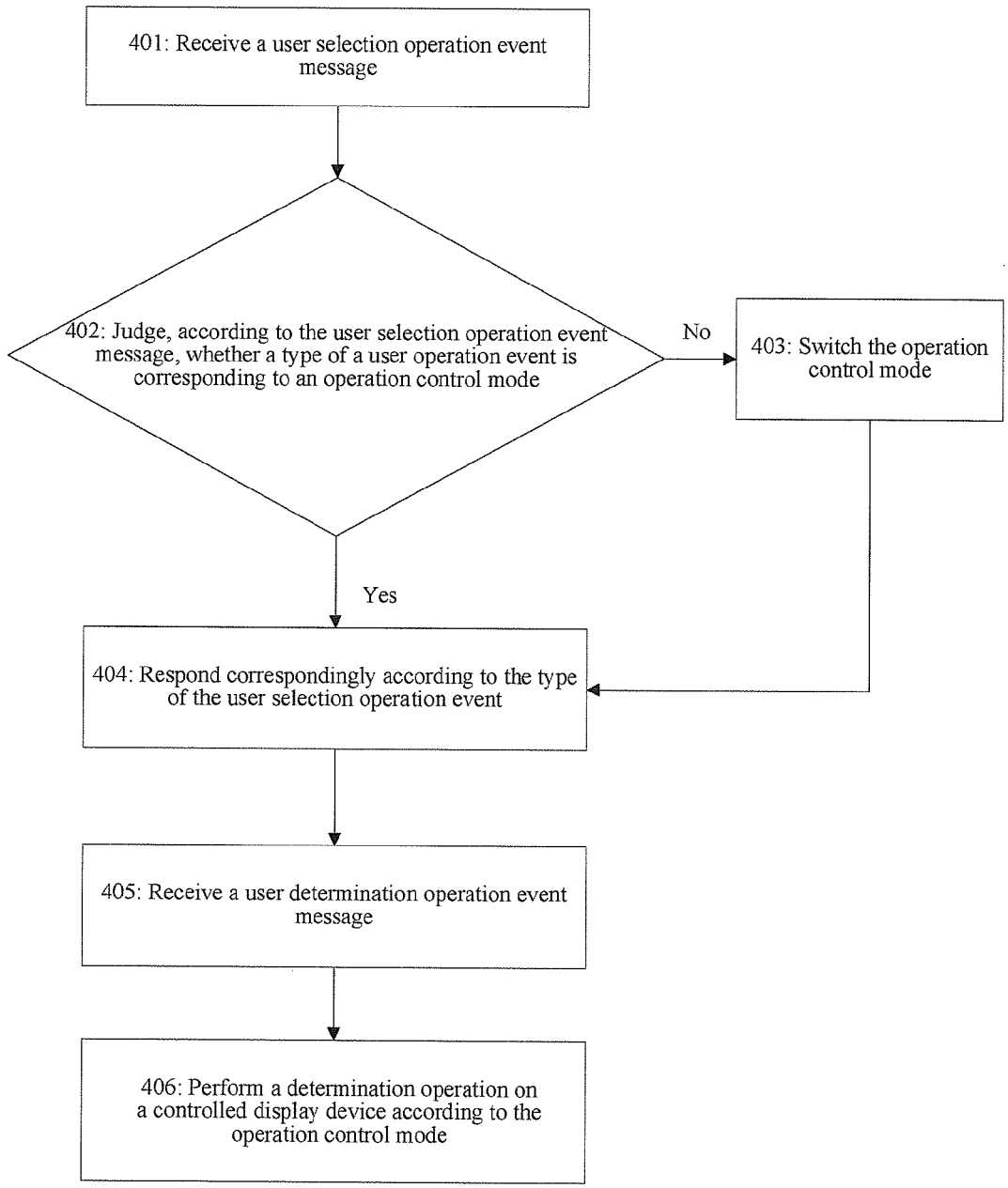
FIG. 4 is a flow chart of a remote control response method according to an embodiment of the present invention.

FIG. 4 is a flow chart of a remote control response method according to an embodiment of the present invention.

401: Receive a user selection operation event message.

Specifically, a receiving apparatus is disposed in a set-top box or a multimedia television, and can receive a user selection operation event message sent by a remote controller. In this embodiment, a user selection, operation event includes a mouse displacement event and a direction key event. The mouse displacement event is that a user changes a position of the remote controller in three-dimensional space, and includes continuously and rapidly moving left and right or moving up and down for multiple times, and so on. The direction key event is that the user presses multiple direction keys that are disposed on the remote controller.

402: Judge, according to the user selection operation event message, whether a type of a user operation event is corresponding to an operation control mode.

Specifically, in this embodiment, in a set-top box or a multimedia television, the operation control mode has merely two types. One is a mouse mode, and in this mode, the remote controller may be used as a mouse to operate and control the set-top box or the multimedia television through spatial movement. The other one is a key mode, and in this mode, the remote controller functions as a conventional remote controller, which may control the set-top box or the multimedia television by pressing a function key that is disposed on the remote controller. The remote controller or the multimedia television, after judging the type of the user selection operation event, further analyzes an operation control mode of the remote controller. The judging whether the user selection operation event is corresponding to the operation control mode includes: One is that if the user selection operation event is a mouse displacement event and the operation control mode is a mouse mode, the user selection operation event is corresponding to the operation control mode; another one is that if the user selection operation event is a direction key event and the operation control mode is a key mode, the user selection operation event is also corresponding to the operation control mode; and furthermore, another one is that if the user selection operation event is a mouse displacement event, but the operation control mode is a key mode, or the user selection operation event is a direction key event, but the operation control mode is a mouse mode, the user selection operation event is not corresponding to the operation control mode.

403: When the user selection operation event is not corresponding to the operation control mode, switch the operation control mode.

Specifically, when the user selection operation event is a mouse displacement event an the operation control mode is a key mode, or the user selection operation event is a direction key event and the operation control mode is a mouse mode, the operation control mode is switched first, that is, when the user selection operation event is a mouse displacement event and the operation control mode is a key mode, the operation control mode is switched into a mouse mode, and when the user selection operation event is a direction key event and the operation control mode is a mouse mode, the operation control mode is switched into a key mode.

404: Respond correspondingly according to the type of the user selection operation event.

Figure 7:
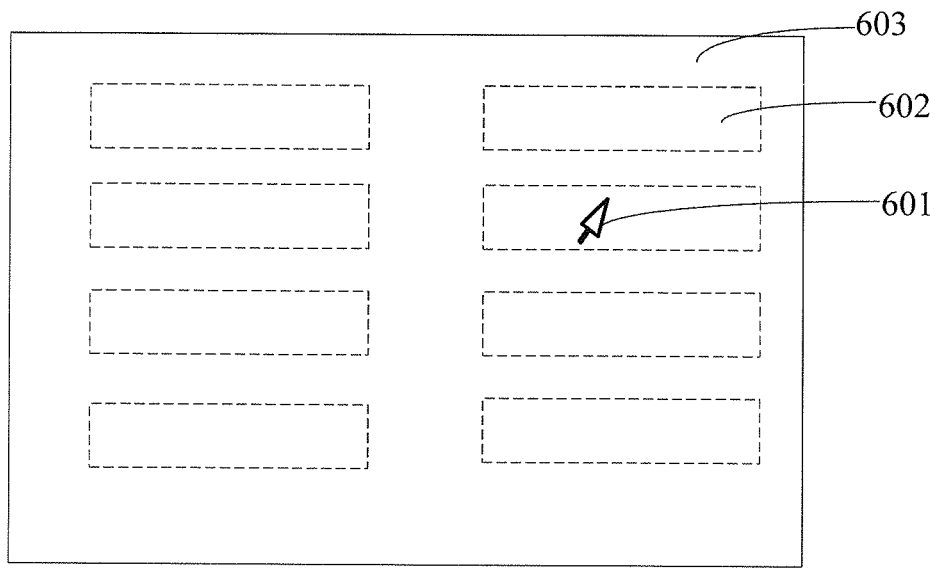
FIG. 7 is a schematic diagram of a display interface of a controlled device according to an embodiment of the present invention.
Figure 8:
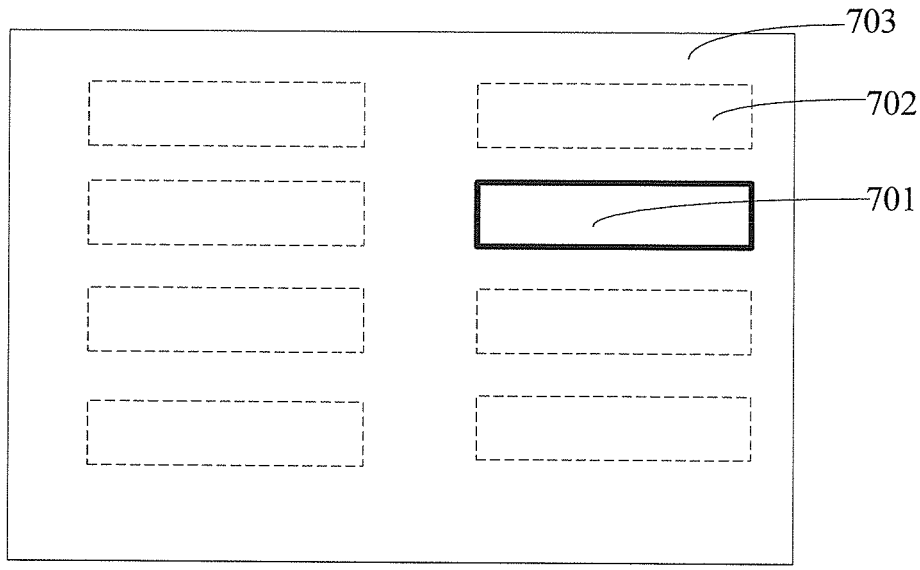
FIG. 8 is a schematic diagram of a display interface of a controlled device according to another embodiment of the present invention.

Specifically, as shown in FIG. 7 and FIG. 8, several selection boxes 602 are displayed on a display interface 603. When the user selection operation event is a mouse displacement event, the set-top box or the multimedia television displays, according to a mouse displacement event output by the user, a mouse pointer 601 on a display interface of the multimedia television, and hides a control focus at the same time, so that the multimedia television only displays one attention focus of the user, thereby avoiding a visual error, and improving user experience. In addition, when the user selection operation event is a direction key event, the set-top box or the multimedia television displays a control focus on the display interface of the multimedia television, that is, a border of a selection box 701 is bolded, and hides a pointer 601, so that a corresponding response is made conveniently according to a subsequent remote control key operation of the user.

405: Receive a user determination operation event message.

Specifically, in this embodiment of the present invention, on the remote controller, a conventional left mouse button is combined with a confirm key of a conventional remote controller. When the remote controller is in a mouse mode, the user may press a confirm key to perform a determination function of a conventional left mouse button, and the set-top box or the multimedia television receives a left mouse button determination event. When the remote controller is in a key mode, the user may press a confirm key to perform a selection determination function, and the set-top box or the multimedia television receives a remote control confirm key event.

406: Judge a type of the operation control mode, and perform a determination operation on a controlled display device according to the operation control mode.

Specifically, in this embodiment of the present invention, the operation control mode has merely two types, namely, a mouse mode and a key mode.

When the operation control mode is a key mode, a remote control confirm key event is received, and the set-top box or the multimedia television selects a determined application according to the remote control confirm key event, so that the application responds according to user selection. When the operation control models a mouse mode, a left mouse button event is received, and the set-top box or the multimedia television selects a determined application according to the left mouse button event, so that the application responds according to user selection. When the operation control models a key mode, a remote control determination event is received, and the set-top box or the multimedia television selects a determined application according to the remote control determination event, so that the application responds according to user selection.

Figure 5:
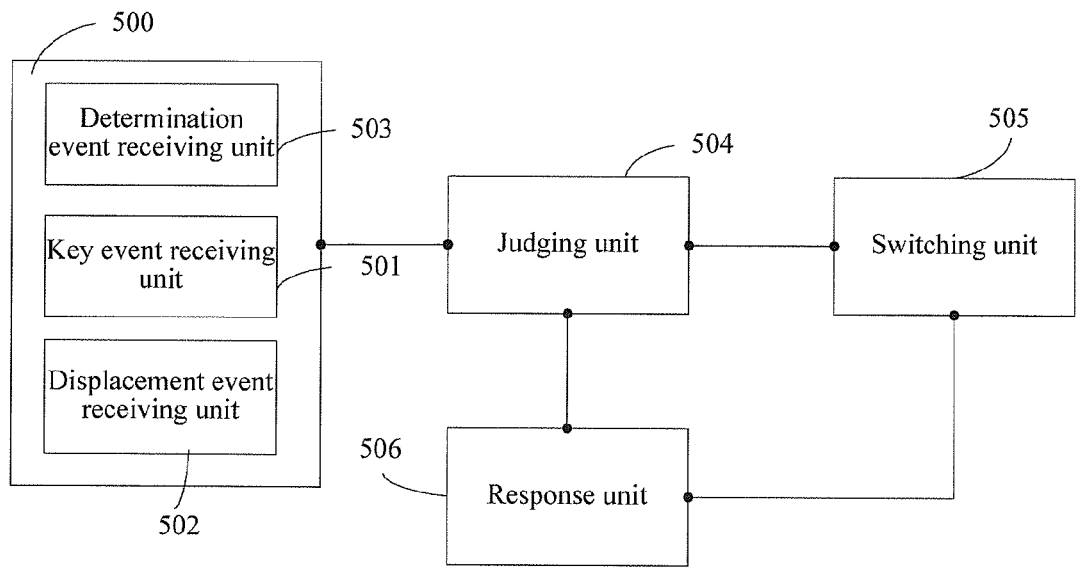
FIG. 5 is a diagram of function modules of a set-top box according to an embodiment of the present invention.

FIG. 5 is a structural block diagram of a set-top box according to an embodiment of the present invention.

A message receiving module 500, a judging unit 504, a switching unit 505, and a response unit 506 are included. The message receiving module 500 specifically includes: a key event receiving unit 501, a displacement event, receiving unit 502, and a determination event receiving unit 503. The key event receiving unit 501 is configured to receive a direction key operation event of a user, and the displacement event receiving unit 502 is configured to receive a mouse displacement event.

The judging unit 504 is configured to judge an operation control mode type of a remote controller, and further configured to judge whether a type of a user selection operation event is corresponding to an operation control mode. Specifically, if the user selection operation event is a mouse displacement event and the operation control mode is a mouse mode, the user selection operation event is corresponding to the operation control mode. Another one is that if the user selection operation event is a direction key event and the operation control mode is a key mode, the user selection on operation event is also corresponding to the operation control mode. Furthermore, another one is that if the user selection operation event is a mouse displacement event, but the operation control mode is a key mode, or the user selection operation event is a direction key event, but the operation control mode is a mouse mode, the user selection operation event is not corresponding to the operation control mode.

The switching unit 505 is configured to, when the operation control mode is not corresponding to the user selection operation event, switch the operation control mode. Specifically, when the user selection operation event is a mouse displacement event and the operation control mode is a key mode, or the user selection operation event is a direction key event and the operation control mode is a mouse mode, the operation control mode is switched first, that is, when the user selection operation event is a mouse displacement event and the operation control models a key mode, the operation control mode is switched into a mouse mode, and when the user selection operation event is a direction key event and the operation control mode is a mouse mode, the operation control mode is switched into a key mode, so that it is convenient for the user to perform a subsequent mouse or remote control operation.

The response unit 500 is configured to respond to a corresponding user selection operation event message. Specifically, when the user selection operation event is a mouse displacement event, the set-top box or the multimedia television displays, according to a mouse displacement event output by the user, a mouse pointer on a display interface of the multimedia television, and hides a control focus at the same time, so that the multimedia television only displays one attention focus of the user, thereby avoiding a visual error, and improving user experience. In addition, when the user selection operation event is a direction key event, the set-top box or the multimedia television displays a control focus and hides a pointer on the display interface of the multimedia television, so that a corresponding response is made conveniently according to a subsequent remote control key operation of the user.

In addition, in another embodiment of the present invention, the response unit 506 further responds to a corresponding determination operation event message according to the operation control mode. Specifically, when the operation control mode is a mouse mode, a left mouse button event is received. The set-top box or the multimedia television selects a determined application according to the left mouse button event, so that the application responds according to user selection. When the operation control mode is a key mode, a remote control determination event is received, so that the set-top box or the multimedia television selects a determined application according to the remote control determination event, and therefore the application responds according to user selection.

With the set-top box or the multimedia television in this embodiment of the present invention, when the user operates with a key mode, a mouse pointer is hidden, so that a disturbance brought by two visual concerns appearing on the display interface of the multimedia television is avoided, thereby improving a user experience effect. In addition, a specific mode switching action of this remote controller is consistent with a use habit of the user, because in a remote controller mode, no mouse pointer is required on a screen, and if the user wants to use a mouse at this time, the user may naturally think that a position of the mouse is to be found through continuous movement, because it is known that eves capture a moving target more sensitively than capture a stationary target. In this way, the user can use almost without learning.

Figure 9A:
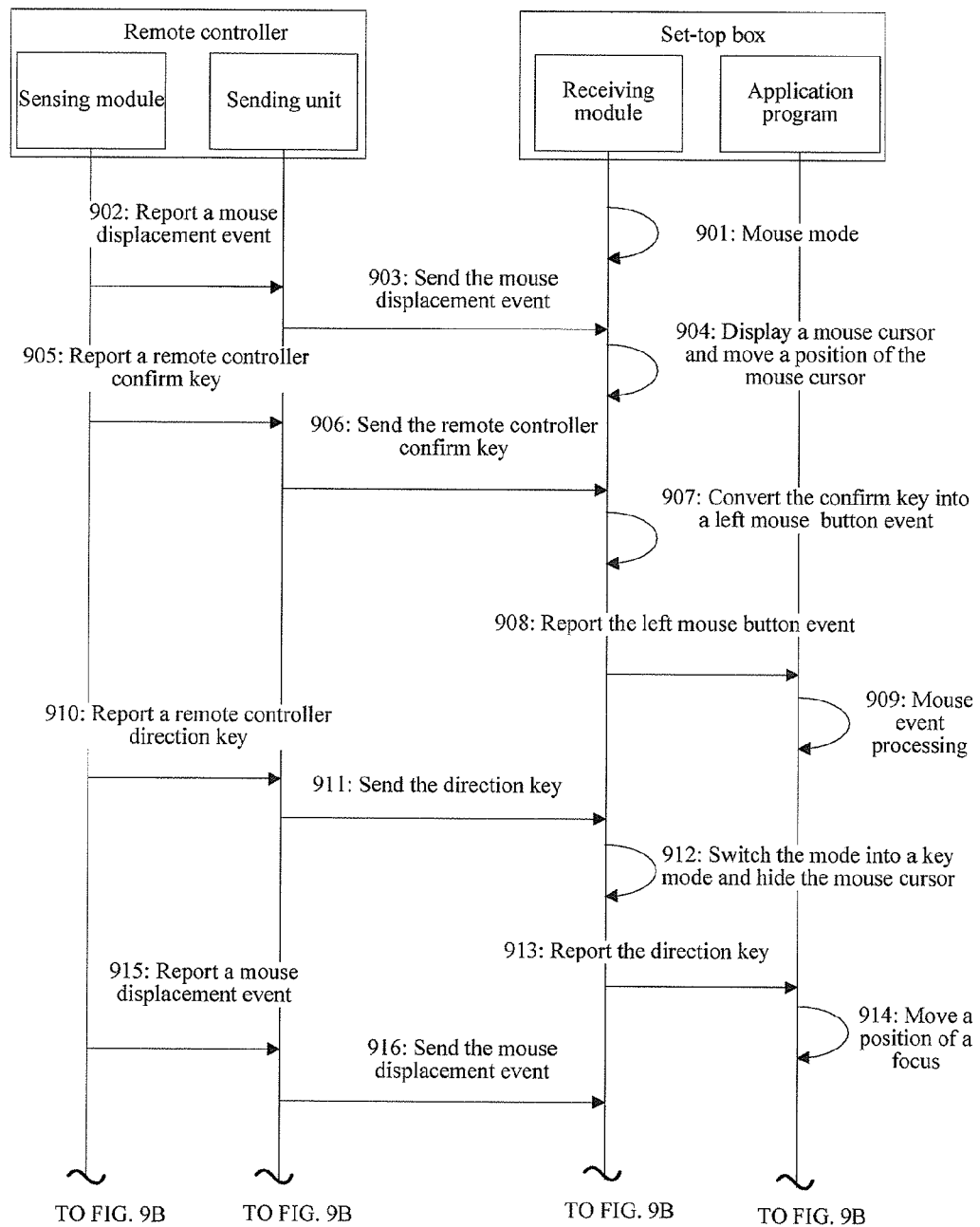
FIGS. 9A and 9B is a diagram of signaling interaction of a remote control method according to an embodiment of the present invention.
Figure 9B:
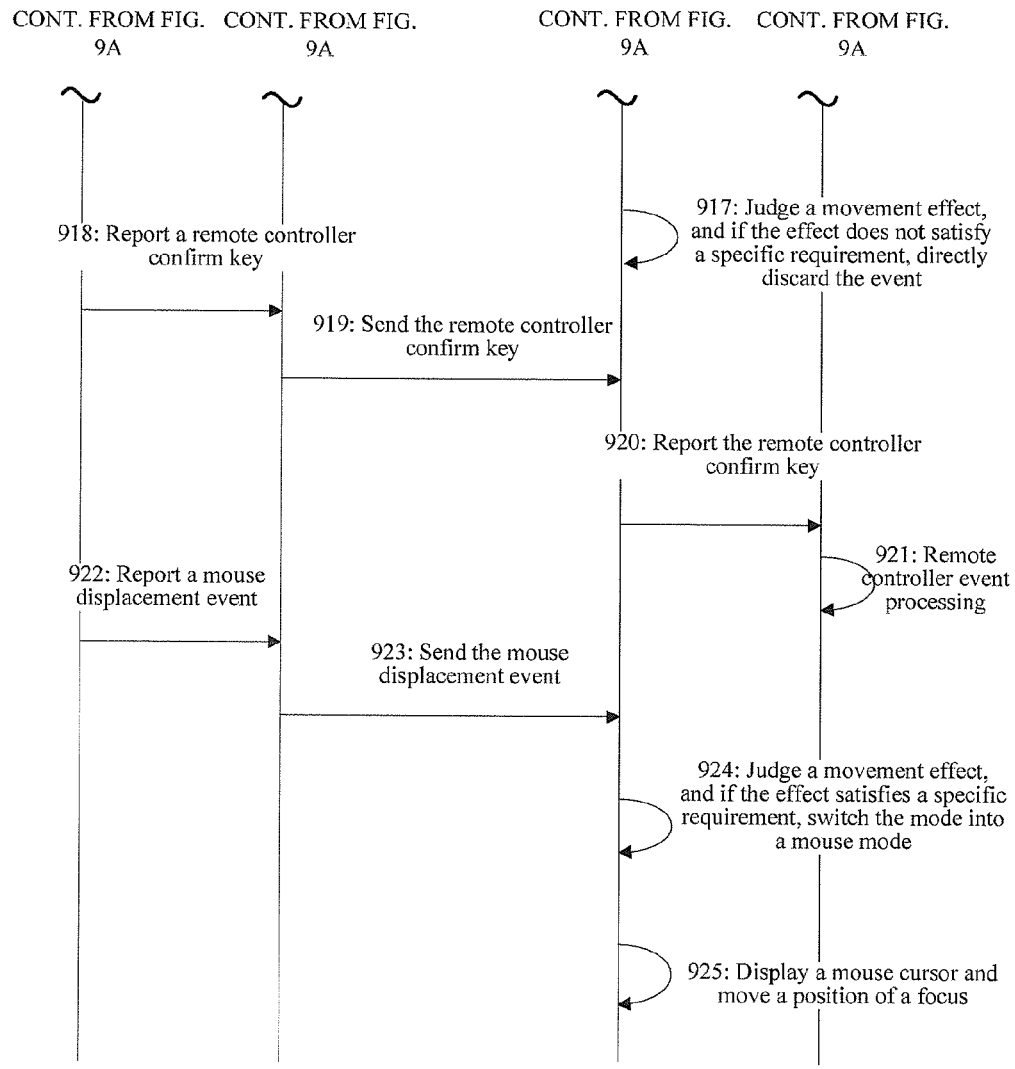

FIG. 9 is a diagram of signaling interaction between a remote controller and a set-top box in a remote control method according to an embodiment of the present invention.

As shown in FIG. 9, in this embodiment, an operation control mode is switched at a set-top box side, and a remote controller only sends various operation events. A set-top box initially works in a certain state, which is assumed to be a mouse state. At this time, the remote controller senses a mouse displacement event, and directly sends the mouse displacement event to the set-top box or a multimedia television. The set-top box or the multimedia television displays a mouse cursor and moves a position. At this time, the remote controller senses a user determination operation event, and directly sends the user determination, operation event to the set-top box. The set-top box converts the determination operation event into a left mouse button event, and reports the left mouse button event to an application program of the set-top box, so that the application program is selected and makes a response. At this time, the remote controller senses a direction key event, and directly sends the direction key event to the set-top box. The set-top box switches the operation control mode into a key mode, hides the mouse cursor, and moves a position of a focus. At this time, the remote controller further senses a mouse displacement event, and directly sends the mouse displacement event to the set-top box. The set-top box judges whether the mouse displacement event is a preset user selection operation event, which is specifically an event of continuously and rapidly moving the remote controller left and right for more than three times. If no, the set-top box directly discards the event, and if yes, the set-top box switches the operation control mode from the key mode to a mouse mode. A function of a sensing module in the remote controller may be implemented by the direction key event sensing unit 201, the displacement event sensing unit 202 and the determination event sensing unit 203 in FIG. 2. A receiving module in the set-top box may be implemented by the key event receiving unit 501, the displacement event receiving unit 502, and the determination event receiving unit 503 in FIG. 5. An application program in the set-top box is corresponding to the response unit 506 in FIG. 5. A specific procedure of the signaling interaction is as follows.

901: An initial state of a set-top box is a mouse mode.

902: A sensing module of a remote controller senses a mouse displacement event and reports the mouse displacement event to a sending unit.

903: The sending unit of the remote controller sends the mouse displacement event to a receiving module of the set-top box.

904: The set-top box displays a mouse cursor and moves a position of the cursor.

905: At this time, the sensing module of the remote controller senses a user determination operation event.

905: At the same time, the sending unit of the remote controller sends the user determination operation event to the set-top box.

907: The set-top box converts the user determination operation event into a left mouse button event.

908: The set-top box reports the left mouse button event to an application program of the set-top box.

909: The set-top box completes processing of the left mouse button event.

910: At this time, the sensing module of the remote controller senses a direction key event and reports the direction key event to the sending unit.

911: The sending unit of the remote controller sends the direction key event to the set-top box.

912: The set-top box switches an operation control mode into a key mode and hides the mouse cursor.

913: A receiving unit of the set-top box reports the direction key event to the application program of the set-top box.

914: The set-top box responds to the direction key event and moves a focus.

915: The sensing module of the remote controller senses a mouse displacement event.

916: The remote controller sends the mouse displacement event to the set-top box.

917: The set-top box judges whether the mouse displacement event complies with a preset selection operation event, and if no, directly discards the event.

918: The remote controller senses a user determination operation event and sends the user determination operation event to the sending unit.

919: The sending unit sends the user determination operation event to the set-top box.

920: The set-top box determines the user determination operation event as a remote control confirm key event, and reports the remote control confirm key event to the application program of the set-top box.

921: The application program completes processing of the remote controller confirm key event.

922: The remote controller senses a mouse displacement event.

923: The remote controller sends the mouse displacement event to the set-top box.

924: The set-top box judges whether the mouse displacement event is a preset specific event, and if yes, switches the operation control mode into a mouse mode and displays the mouse cursor.

925: The set-top box displays a mouse cursor and moves a position the cursor.

Figure 10A:
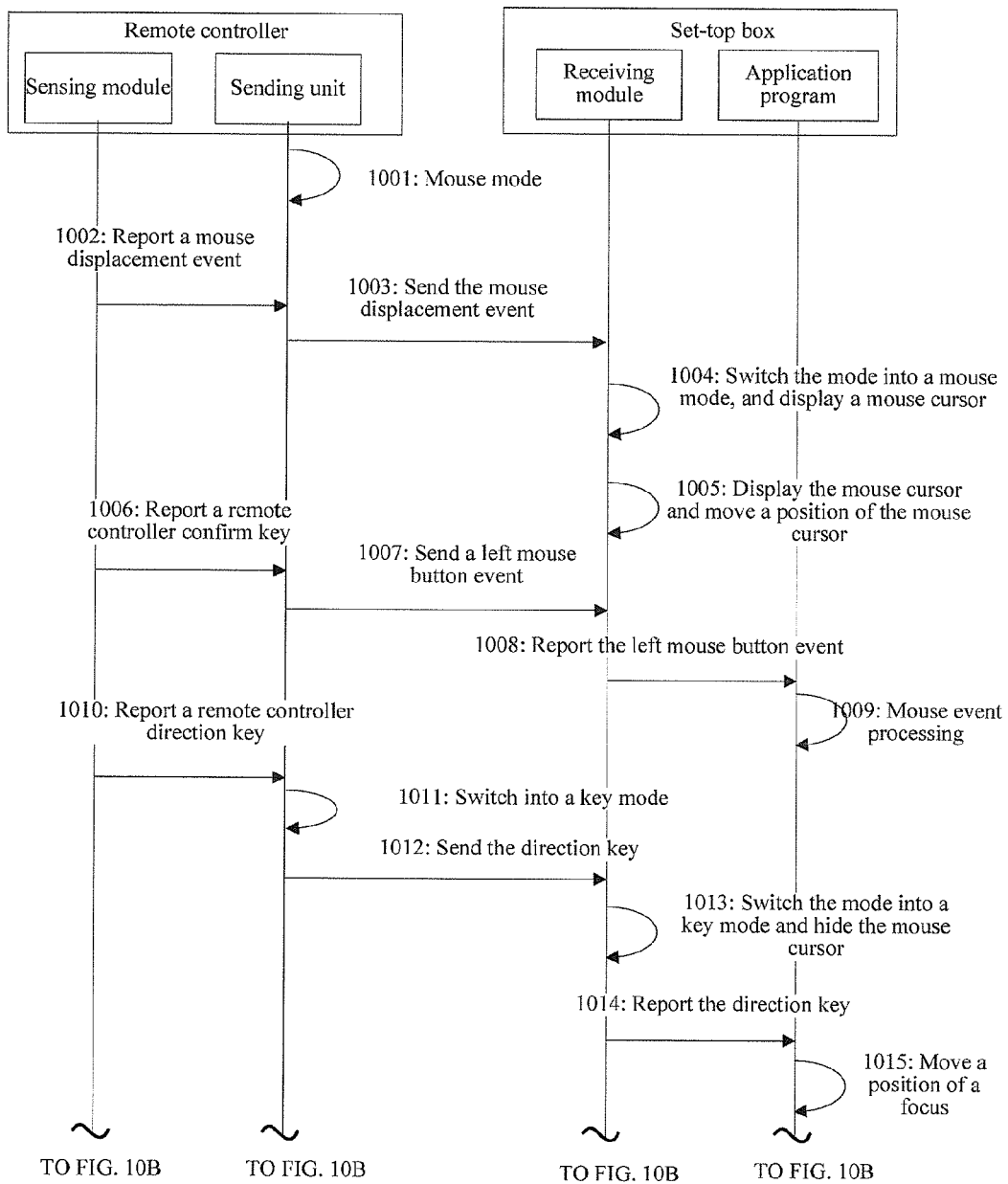
FIGS. 10A and 10B is a diagram of signaling interaction of a remote control method according to another embodiment of the present invention.
Figure 10B:
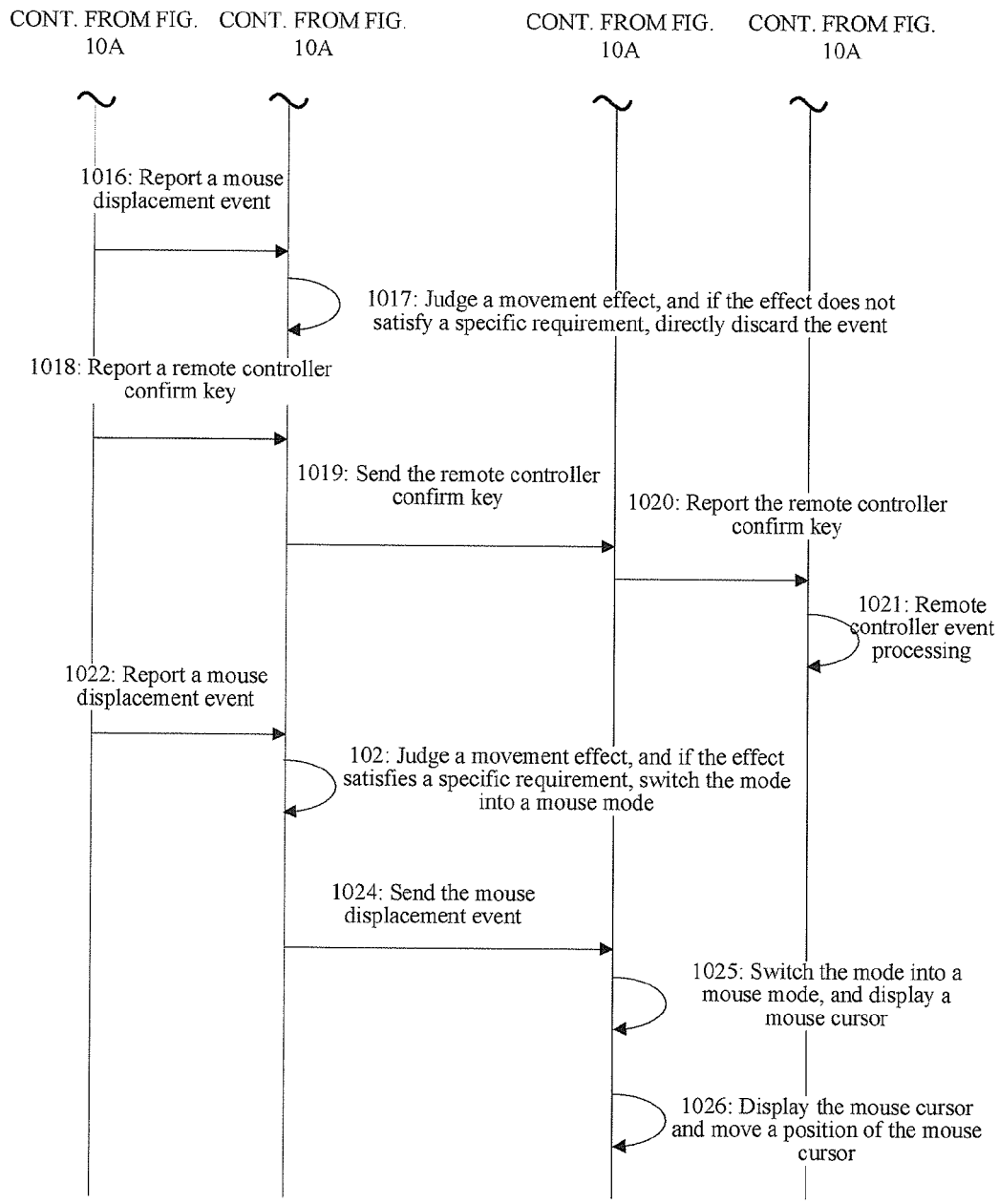

A scenario is selected in the following. FIG. 10 is a diagram of signaling interaction between a remote controller and a set-top box in a remote control method according to an embodiment of the present invention. A specific application of the remote control method in this embodiment of the present invention is illustrated in detail in a specific scenario.

It is assumed that an initial state of a remote controller is a mouse mode. At this time, the remote controller senses a mouse displacement event and directly sends the mouse displacement event to a set-top box or a multimedia television. The set-top box or the multimedia television, after receiving the mouse displacement event, switches a mode into a mouse mode, and displays a mouse pointer. At the same time, the set-top box or the multimedia television, displays a position of the mouse pointer on the multimedia television according to mouse displacement. At this time, the remote controller senses a remote controller confirm key event and sends the remote controller confirm key event as a left mouse button event to the set-top box or the multimedia television, and the set-top box or the multimedia television reports the left mouse button event to an application program to complete response processing of a mouse event.

At this time, the remote controller senses a direction key event of a user, switches an operation control mode into a key mode, and sends the direction key event to the set-top box or the multimedia television at the same time. When receiving the direction key event, the set-top box or the multimedia television switches the mode into a remote controller mode, and hides a mouse pointer at the same time, so that only one attention focus appears on a television screen and movement of the focus on a display interface of the television is completed.

At this time, the remote controller further senses a mouse displacement event. The remote controller firstly judges whether the mouse displacement event complies with a specific action, as shown in FIG. 6, for example, continuously and rapidly moving left and right for three times. If no, the mouse displacement event is not sent to the set-top box or the multimedia television because the remote controller is in a key mode. If the mouse displacement event complies with a specific action, for example, continuously and rapidly moving left and right for three times, the remote controller switches the operation control mode into a mouse mode, and sends the mouse displacement event to the set-top box or the multimedia television at the same time. The set-top box or the multimedia television, after receiving the mouse displacement event, switches the operation control mode into a mouse mode correspondingly, and displays a mouse pointer and draws a position of the mouse pointer on a display interface of the multimedia television. A function of a sensing module in the remote controller may be implemented by the direction key event sensing unit 201, the displacement event sensing unit 202, and the determination event sensing unit 203 in FIG. 2. A receiving module in the set-top box may be implemented by the key event receiving unit 501, the displacement event receiving unit 502, and the determination event receiving unit 503 in FIG. 5. An application program in the set-top box is corresponding to the response unit 506 in FIG. 5. A specific procedure of the signaling interaction is as follows.

1001: A remote controller is in a mouse mode at this time.

1002: At this time, a sensing unit senses a mouse displacement event and reports the mouse displacement event to a sending unit.

1003: The sending unit sends the mouse displacement event to a set-top box.

1004: After receiving the mouse displacement event, the set-top box switches an operation control mode into a mouse mode if a current operation control mode of the set-top box is a key mode; and conversely, no switching is required.

1005: At the same time, the set-top box displays a mouse cursor and moves a position of the mouse cursor.

1006: At this time, a sensing module of the remote controller senses a user determination operation event, and reports a left mouse button event to the sending unit.

1007: The remote controller sends the left mouse button event to the set-top box.

1008: A receiving unit of the set-top box reports the left mouse button event to an application program of the set-top box.

1009: The application program completes a response to the left mouse button event.

1010: The sensing module of the remote controller senses a direction key event and reports the direction key event to the sending unit.

1011: The remote controller switches the operation control mode into a key mode.

1012: At the same time, the remote controller sends the direction key event to the set-top box.

1013: The set-top box, after receiving the direction key event, switches the operation control mode into a key mode, and hides the mouse cursor.

1014: The set-top box reports the direction key event to the application program.

1015: The application program responds to the direction key event, and completes movement of a focus.

1016: At this time, the remote controller senses a mouse displacement event and reports the mouse displacement event to the sending unit.

1017: The remote controller judges whether the mouse displacement event is a preset use selection operation event, and if the event is not a preset user selection operation event, directly discards the event.

1018: The remote controller senses a user determination operation event.

1019: The remote controller determines the user determination operation event as a remote controller confirm key event, and sends the remote control confirm key event to the set-top box.

1020: The set-top box reports the remote control confirm key event to the application program of the set-top box.

1021: The application program of the set-top box completes processing of the remote control confirm key event.

1022: The remote controller senses a mouse displacement event and reports the mouse displacement event to the sending unit.

1023: If the remote controller determines that the mouse displacement event is a preset user selection operation event, the remote controller switches the operation control mode into a mouse mode.

1024: Send the mouse displacement event to the set-top box.

1025: The set-top box switches the operation control mode into a mouse mode, and displays a mouse cursor.

1026: The set-top box displays the mouse cursor and moves a position of the mouse cursor.

With the remote control method in the foregoing embodiment of the present invention, because a left mouse button of a remote controller is combined with a remote control confirm key, a remote control operation interface is simple, so that a user uses the remote controller more comfortably and simply. In addition, the remote control method complies with a use habit of the user in terms of operation control mode switching, so that the user may trigger operation control mode switching through natural association without special learning, thereby improving a user experience effect. At the same time, when the user operates in a key mode, a mouse pointer is hidden, so that a disturbance brought by two visual concerns appearing on a display interface of a multimedia television is avoided, and the user experience effect is further improved.

Persons of ordinary skill in the art may understand that, all or a part of procedures in the method according to the foregoing embodiments may be accomplished by a computer program instructing relevant hardware. The program may be stored in a computer-readable storage medium. When the program runs, the procedures of the method according to the foregoing embodiments are performed. The storage medium may be a magnetic disk, an optical disk, a read-only memory (ROM: Read Only Memory), or a random access memory (RAM: Random Access Memory), and so on.

In conclusion, the foregoing descriptions are merely exemplary embodiments of: the present invention, but are not intended to limit the protection scope of the present invention. Any modification, equivalent replacement, or improvement made without departing from the spirit and principle of the present invention shall all fall within the protection scope of the present invention.

What is claimed is:

1. A remote control method, comprising:
presetting a user selection operation event, wherein the preset user selection operation event is an event of continuously and rapidly moving a remote controller left and right for more than three times or is an event of continuously and rapidly sliding and touching a remote controller left and right for more than three times;
sensing a user selection operation event, and when the sensed user selection operation event corresponds to the preset user selection operation event, judging a type of the sensed user selection operation event, wherein the type of the sensed user selection operation event comprises a mouse displacement event and a direction key event;
when the type of the sensed user selection operation event corresponds to an operation control mode type, sending a user selection operation event message, wherein the operation control mode type comprises a mouse mode and a key mode;
when the type of the sensed user selection operation event does not correspond to the operation control mode type, switching an operation control mode, and sending a user selection operation event message; and
sensing a user determination operation event, and sending a user determination operation event message that corresponds to the operation control mode type.

2. The remote control method according to claim 1, wherein the type of the sensed user selection operation event corresponds to the operation control mode type comprises:
the sensed user selection operation event is the mouse displacement event, and the operation control mode type is the mouse mode; or
the sensed user selection operation event is the direction key event, and the operation control mode type is the key mode.

3. The remote control method according to claim 1, wherein the type of the sensed user selection operation event does not correspond to the operation control mode type comprises:
the sensed user selection operation event is the mouse displacement event, and the operation control mode type is the key mode.

4. The remote control method according to claim 3, wherein switching an operation control mode, and sending a corresponding user selection operation event message comprises:
switching the operation control mode from the key mode to the mouse mode directly, and sending a mouse displacement event message, wherein with the sent mouse displacement event message, a controlled display device hides a control focus on a display interface of the controlled display device, and displays a mouse pointer.

5. The remote control method according to claim 1, wherein the type of the sensed user selection operation event does not correspond to the operation control mode type comprises:

the sensed user selection operation event is the direction key event, and the operation control mode type is the mouse mode.

6. The remote control method according to claim 5, wherein switching an operation control mode, and sending a corresponding user selection operation event message comprises:

switching the operation control mode from the mouse mode to the key mode directly, and sending a direction key event message, wherein with the sent direction key event message, a controlled display device hides a mouse pointer on a display interface of the controlled display device, and displays a control focus.

7. The remote control method according to claim 1, wherein sending the user determination operation event message that corresponds to the operation control mode type comprises:

if the operation control mode type is the mouse mode, sending a left mouse button event message; and if the operation control mode type is the key mode, sending a remote control confirm key event message.

8. A remote controller, comprising:

a key event sensing unit, configured to sense a user selection operation event that is generated through key-press of a user;

a displacement event sensing unit, configured to sense a user selection operation event that is generated through mouse displacement;

a determination event sensing unit, configured to sense a user determination operation event;

a judging unit, configured to judge whether a type of the sensed user selection operation event from the key event sensing unit or the displacement event sensing unit corresponds to an operation control mode type; wherein the type of the sensed user selection operation event comprises a mouse displacement event and a direction key event, and the operation control mode type comprises a mouse mode and a key mode;

a switching unit, configured to switch from the key mode to the mouse mode, when the operation control mode type is the key mode, the sensed user selection operation event is the mouse displacement event and the mouse displacement event complies with a specific operation action that indicates continuously and rapidly moving the remote controller left and right for more than three times or continuously and rapidly sliding and touching the remote controller left and right for more than three times; and a sending unit, configured to send a user selection operation event message, and send a user determination operation event message that corresponds to the operation control mode type.

9. The remote controller according to claim 8, wherein the key event sensing unit is several mechanical keys that are located on the remote controller.

10. The remote controller according to claim 8, wherein the displacement event sensing unit is one of the following: a gyroscope, a grating, a camera, a touch screen, a trackball and a light-sensitive trackball inside the remote controller.

11. The remote controller according to claim 8, wherein the determination event sensing unit is one mechanical key that is located on the remote controller.

12. A remote control response method, comprising:

receiving a user selection operation event message, and judging a type of a user selection operation event according to the user selection operation event message; wherein the type of the user selection operation event comprises a mouse displacement event and a direction key event;

when the type of the user selection operation event corresponds to an operation control mode type, controlling displaying of a display interface of a controlled display device according to the user selection operation event message and a corresponding operation control mode, wherein the operation control mode type comprises a mouse mode and a key mode;

when the type of the user selection operation event does not correspond to the operation control mode type, switching the corresponding operation control mode, and controlling the displaying of the display interface of the controlled display device according to the user selection operation event message and the switched operation control mode;

receiving a user determination operation event message, judging the operation control mode type, and performing a determination operation on the controlled display device according to the operation control mode;

when the type of the user selection operation event does not correspond to the operation control mode type, switching the operation control mode, and controlling the displaying of the display interface of the controlled display device according to the user selection operation event message and switching the operation control mode comprises:

when the user selection operation event is the mouse displacement event and the operation control mode type is the key mode, switching the operation control mode from the key mode to the mouse mode, displaying a mouse pointer on the display interface, and hiding a control focus.

13. The remote control response method according to claim 12, wherein the user selection operation event corresponds to the operation control mode type comprises:

the user selection operation event is the mouse displacement event, and the operation control mode type is the mouse mode; or the user selection operation event is the direction key event, and the operation control mode type is the key mode.

14. The remote control response method according to claim 12, wherein performing the determination operation on the controlled display device according to the operation control mode type comprises:

if the operation control mode type is the mouse mode, performing a left mouse button event operation; and if the operation control mode type is the key mode, performing a remote control confirm key event operation.

15. A set-top box, comprising:

a message receiving module, configured to receive a user selection operation event message and a user determination operation event message;

a judging module, configured to judge, according to the user selection operation event message, whether a type of a user operation event corresponds to an operation control mode type; wherein the type of the user selection operation event comprises a mouse displacement event and a direction key event, and the operation control mode type comprises a mouse mode and a key mode;

a switching module, configured to, when the type of the user selection operation event does not correspond to the operation control mode type, switch an operation control mode;

a response module, configured to control, according to the user selection operation event message and a corresponding operation control mode, displaying of a display interface of a controlled display device, and perform a determination operation on the controlled display device according to the user determination operation event message and the operation control mode;

wherein the switching module is configured to switch the operation control mode from the key mode to the mouse mode when the user selection operation event is the mouse displacement event and the operation control mode type is the key mode; and the response module is configured to display a mouse pointer on the display interface and hide a control focus.

16. A remote control response method, comprising:

receiving a user selection operation event message, and judging a type of a user selection operation event according to the user selection operation event message; wherein the type of the user selection operation event comprises a mouse displacement event and a direction key event;

when the type of the user selection operation event corresponds to an operation control mode type, controlling displaying of a display interface of a controlled display device according to the user selection operation event message and a corresponding operation control mode, wherein the operation control mode type comprises a mouse mode and a key mode;

when the type of the user selection operation event does not correspond to the operation control mode type, switching the corresponding operation control mode, and controlling the displaying of the display interface of the controlled display device according to the user selection operation event message and the switched operation control mode;

receiving a user determination operation event message, judging the operation control mode type, and performing a determination operation on the controlled display device according to the operation control mode; and when the type of the user selection operation event does not correspond to the operation control mode type, switching the operation control mode, and controlling the displaying of the display interface of the controlled display device according to the user selection operation event message, and switching the operation control mode comprises:

when the user selection operation event is the direction key event and the operation control mode type is the mouse mode, switching the operation control mode from the mouse mode to the key mode, displaying a control focus on the display interface, and hiding a mouse pointer.

17. The remote control response method according to claim 16, wherein the user selection operation event corresponds to the operation control mode type comprises:

the user selection operation event is the mouse displacement event, and the operation control mode type is the mouse mode; or the user selection operation event is the direction key event, and the operation control mode type is the key mode.

18. The remote control response method according to claim 16, wherein performing the determination operation on the controlled display device according to the operation control mode type comprises:

if the operation control mode type is the mouse mode, performing a left mouse button event operation; and if the operation control mode type is the key mode, performing a remote control confirm key event operation.

19. A set-top box, comprising:

a message receiving module, configured to receive a user selection operation event message and a user determination operation event message;

a judging module, configured to judge, according to the user selection operation event message, whether a type of a user operation event corresponds to an operation control mode type, wherein the type of the user selection operation event comprises a mouse displacement event and a direction key event, and the operation control mode type comprises a mouse mode and a key mode;

a switching module, configured to, when the type of the user selection operation event does not correspond to the operation control mode type, switch an operation control mode;

a response module, configured to control, according to the user selection operation event message and a corresponding operation control mode, displaying of a display interface of a controlled display device, and perform a determination operation on the controlled display device according to the user determination operation event message and the operation control mode;

wherein the switching module is configured to switch the operation control mode from the mouse mode to the key mode when the user selection operation event is the direction key event and the operation control mode type is the mouse mode; and the response module is configured to display a control focus on the display interface and hide a mouse pointer.

* * * * *